（12） United States Patent
Deakin

(10) Patent No.: US 12,320,336 B2
(45) Date of Patent: Jun. 3, 2025

(54) SEALING SYSTEM FOR FLYWHEEL IN A VACUUM

(71) Applicant: Punch Flybrid Limited, Silverstone (GB)

(72) Inventor: Andrew Deakin, Silverstone (GB)

(73) Assignee: PUNCH FLYBRID LIMITED, Silverstone (GB)

( * ) Notice: Subject to any disclaimer, the term of this patent is extended or adjusted under 35 U.S.C. 154(b) by 0 days.

(21) Appl. No.: 18/552,851

(22) PCT Filed: Mar. 30, 2022

(86) PCT No.: PCT/GB2022/050789
§ 371 (c)(1),
(2) Date: Sep. 27, 2023

(87) PCT Pub. No.: WO2022/208073
PCT Pub. Date: Oct. 6, 2022

(65) Prior Publication Data
US 2024/0159223 A1  May 16, 2024

(30) Foreign Application Priority Data
Mar. 30, 2021  (GB) .................................. 2104486

(51) Int. Cl.
*F03G 3/08*  (2006.01)
*F16J 15/3284*  (2016.01)
(Continued)

(52) U.S. Cl.
CPC ............ *F03G 3/08* (2013.01); *F16J 15/3284* (2013.01); *F16N 7/38* (2013.01); *F16N 29/02* (2013.01);
(Continued)

(58) Field of Classification Search
CPC ........ F16N 7/38; F16N 29/02; F16N 2210/14; F16N 2270/62; F16N 2270/64; F16J 15/3284
See application file for complete search history.

(56) References Cited

U.S. PATENT DOCUMENTS

| 4,193,646 A | 3/1980 | Nieder et al. |
| 6,689,221 B2 * | 2/2004 | Ryding ................. C23C 14/505 |
| | | 118/724 |

(Continued)

FOREIGN PATENT DOCUMENTS

| CN | 104578595 | 4/2015 |
| GD | 2535182 | 8/2016 |

(Continued)

OTHER PUBLICATIONS

Frechard, Fabrice; International Search Report; Jun. 17, 2022; 2 pages.

(Continued)

*Primary Examiner* — Thomas C Diaz
(74) *Attorney, Agent, or Firm* — STETINA GARRED BRUCKER & NEWBOLES

(57) ABSTRACT

An apparatus comprising: a flywheel; a shaft; a bearing arrangement for supporting the shaft; a sealing arrangement; and a housing for housing the flywheel, the shaft, the bearing arrangement and the sealing arrangement, wherein the flywheel is mounted on the shaft, the sealing arrangement is mounted between the shaft and the housing, and the bearing arrangement is mounted both to the shaft, between the flywheel and the sealing arrangement, and to the housing; and wherein the sealing arrangement comprises a pair of seals that are configured to extend circumferentially around the shaft, the seals being arranged to form a hermetic seal against the shaft to hermetically seal the housing.

19 Claims, 6 Drawing Sheets

(51) Int. Cl.
*F16N 7/38* (2006.01)
*F16N 29/02* (2006.01)

(52) U.S. Cl.
CPC ...... *F16N 2210/14* (2013.01); *F16N 2270/62* (2013.01); *F16N 2270/64* (2013.01)

(56) References Cited

U.S. PATENT DOCUMENTS

| | | | |
|---|---|---|---|
| 7,464,941 B2 * | 12/2008 | Hashimoto ....... | H01J 37/32431 |
| | | | 277/913 |
| 8,827,275 B2 * | 9/2014 | Heinrich .................. | F16J 15/46 |
| | | | 277/558 |
| 9,303,721 B2 * | 4/2016 | Early .................. | F16F 15/3156 |
| 10,422,410 B2 * | 9/2019 | Early ..................... | F16C 35/077 |
| 10,707,723 B2 * | 7/2020 | Jones .................. | G05D 16/202 |
| 2008/0067754 A1 * | 3/2008 | Schroeder .............. | F16J 15/006 |
| | | | 277/437 |
| 2014/0331817 A1 * | 11/2014 | Hilton ................... | F16J 15/324 |
| | | | 74/572.2 |

FOREIGN PATENT DOCUMENTS

| | | |
|---|---|---|
| JP | 2016176437 | 10/2016 |
| JP | 2017072191 | 4/2017 |
| WO | 2014076216 | 5/2014 |

OTHER PUBLICATIONS

Gupte, Rahul; Examination Report; Aug. 16, 2021; 3 pages.
Gupte, Rahul; Examination Report; Aug. 13, 2021; 1 page.

* cited by examiner

SEALING SYSTEM FOR FLYWHEEL IN A VACUUM

CROSS-REFERENCE TO RELATED APPLICATIONS

The present application claims priority to PCT International Patent Application No. PCT/GB2022/050789, filed Mar. 30, 2022, and Great Britain Patent Application No. 2104486.2, filed on Mar. 30, 2021, the disclosures of which are incorporated herein by reference.

STATEMENT RE: FEDERALLY SPONSORED RESEARCH/DEVELOPMENT

Not Applicable

BACKGROUND

This invention relates to a sealing arrangement for a flywheel. In particular, this invention relates to a sealing arrangement for sealing a flywheel and a bearing arrangement within an evacuated housing.

BACKGROUND OF THE INVENTION

A flywheel for energy storage and recovery is typically mounted on a shaft in a housing such that the flywheel and the shaft move substantially together. The shaft is mounted on the housing via bearing arrangements either side of the flywheel which allow the shaft (and thus the flywheel) to rotate relative to the housing. Kinetic energy can be stored in the flywheel by increasing the flywheel's speed of rotation. Energy can be recovered from the flywheel by transferring the flywheel's rotational energy to another entity, such as a vehicle drive shaft.

A flywheel which rotates at high speeds (e.g. speeds in excess of 10,000 rpm or 20,000 rpm) experiences large air resistance (or 'windage') forces, because of the high tip speed of the flywheel. This leads to loss of kinetic energy from the flywheel. To reduce such losses, a vacuum pump may be used to at least partially evacuate a chamber within the housing, the flywheel being positioned within the chamber. Evacuating the chamber lowers the pressure within the chamber, optimally to approximately a vacuum level, meaning that the flywheel experiences less air resistance as it rotates in the chamber.

To achieve evacuation of the chamber in the prior art, at least two sealing arrangements are required to hermetically seal the housing. The sealing arrangements are typically mounted between the flywheel and the bearing arrangements, i.e. one sealing arrangement either side of the flywheel. The requirement for several sealing arrangements can result in moderate frictional losses of the flywheel due to contact between the seals and the shaft, as well as sealing fluid which may leak out of the sealing arrangements and into the chamber.

SUMMARY OF THE INVENTION

In a first aspect of the invention, there is provided an apparatus comprising: a flywheel; a shaft; a bearing arrangement for supporting the shaft; a sealing arrangement; and a housing for housing the flywheel, the shaft, the bearing arrangement and the sealing arrangement, wherein the flywheel is mounted on the shaft, the sealing arrangement is mounted between the shaft and the housing, and the bearing arrangement is mounted both to the shaft, between the flywheel and the sealing arrangement, and to the housing; and wherein the sealing arrangement comprises a pair of seals that are configured to extend circumferentially around the shaft, the seals being arranged to form a hermetic seal against the shaft to hermetically seal the housing.

In this way, the bearing arrangements of the flywheel system can be mounted within the evacuated chamber, which allows the evacuated housing/chamber to be sealed using only one sealing arrangement, reducing frictional losses of the flywheel due to contact between the seals and the shaft relative to arrangements having two or more sealing arrangements. Further, this configuration allows the diameter of the sealing contact surface of the sealing arrangement to be less than a diameter of an inner race of the bearing arrangement, further reducing frictional losses of the flywheel caused by sliding of the seals, as both the contact length and the sliding speed of the seals are reduced.

Preferably, the bearing arrangement has an inner face that contacts the shaft, and the sealing arrangement seals against the shaft via a sealing contact surface; and wherein a diameter of the seal contact surface is less than or equal to a diameter of the inner face. In this way, frictional losses of the flywheel caused by sliding of the seals is reduced relative to an arrangement where the diameter of the seal contact surface is more than a diameter of the inner face, as both the contact length and the sliding speed of the seals are reduced.

Preferably, the shaft comprises a first shoulder, between the flywheel and the bearing arrangement, against which the bearing arrangement abuts, and a second shoulder, between the bearing arrangement and the sealing arrangement. In this way, a shoulder is provided for the abutment of the bearing arrangement.

Preferably, the apparatus further comprises a seal carrier that substantially encircles the sealing arrangement and is configured to mount the seals to the housing. In this way, the sealing arrangement, or more specifically the seals of the sealing arrangement, can be more easily mounted onto the shaft after the shaft has been mounted to the flywheel within the housing.

The bearing arrangement may be mounted to the housing via the seal carrier.

Preferably, the seal carrier comprises an elastomeric component that is arranged to mount the seal carrier to the housing. In this way, the elastomeric component is arranged to reduce multi-body resonance that occurs as a result of the interaction between the housing and flywheel. This ensures that the natural modes of the flywheel do not interfere with the natural modes of the housing and vice versa, thereby allowing full speed operation of the flywheel without producing damaging resonance. The elastomeric component may also serve to seal the seal carrier against the housing.

Preferably, the seal carrier is arranged to axially constrain the flywheel.

Preferably, the seal carrier is arranged to allow fluid to be delivered to and from the sealing arrangement. In this way, sealing fluid can be provided to and from the sealing arrangement to facilitate sealing.

Preferably, the apparatus further comprises a lubricant pump that is driven directly by the flywheel and arranged to circulate lubricant from a lubricant supply to the bearing arrangement. Integrating the pump within the evacuated chamber such that it is driven directly from the flywheel allows for a more compact and relatively less complex system design.

The lubricant pump may instead be driven by an electric motor and arranged to circulate lubricant from a lubricant supply to the bearing arrangement.

Preferably, the housing further comprises a sump, and the lubricant pump is mounted to the sump. In this way, run-off lubricant can be collected.

Preferably, the lubricant pressure at an outlet of the lubricant pump is maintained within a pre-determined range above the first pressure. In this way, a consistent flow of lubricant is delivered to the bearing arrangements over a wide range of operating speeds of the flywheel.

Preferably, an excess flow of lubricant is arranged to be released to ensure the maximum pressure of the pre-determined range is not exceeded. In this way, the pre-determined range of pressure can be maintained.

Preferably, the released excess flow of lubricant is supplied to the lubricant supply. In this way, the cooling and lubrication of the bearing arrangements can be increased at higher lubrication pressures, which typically occur at higher operating speeds of the flywheel.

Preferably, the lubricant pressure at an inlet of the lubricant pump is maximised using a direct path from the lubricant supply to the inlet of the lubricant pump. In this way, any potential pressure drop that might occur to the inlet of the pump, due to a partial vacuum and/or partial blockage at the inlet, is mitigated, decreasing the likelihood of cavitation of the pump.

Preferably, a cavity is defined between the seals, the cavity also extending circumferentially around the shaft; and wherein, in use, the sealing arrangement is arranged to maintain a first pressure within the housing that is lower than a second pressure outside of the housing, the seals being arranged to retain a sealing fluid within the cavity, and to maintain the fluid at an intermediate pressure between the first and the second pressure. In this way, a relatively low pressure delta is maintained across each of the seals of the sealing arrangement, for example when compared to the pressure delta across the seals of a sealing arrangement that is maintained at a pressure above atmospheric pressure. Maintaining a relatively low pressure delta across the seals helps to increase the life of the seals, when compared with the life of seals having a higher pressure delta being maintained across them.

Preferably, the intermediate pressure is approximately halfway between the first and second pressure.

Preferably, the first pressure is approximately less than 200 mbar.

Preferably, the apparatus further comprises a labyrinth arrangement, wherein the first pressure is generated using a vacuum pump, and the labyrinth arrangement is configured between the flywheel and the vacuum pump to capture and prevent liquids, such as lubricant, from entering the vacuum pump. In this way, any lubricant that has managed to reach the vacuum port, for example droplets of splashed lubricant, can be captured and redirected to the lubricant reservoir.

Preferably, the apparatus further comprises a valve between the labyrinth arrangement and the vacuum pump that is configured to prevent liquids, such as lubricant, from entering the vacuum pump when the vacuum pump is not operational.

Preferably, the seals are lip seals, and the lip of each seal extend away from the bearing arrangement.

Preferably, the flywheel is configured to rotate at speeds of 10,000 rpm or higher.

BRIEF DESCRIPTION OF THE DRAWINGS

These and other features and advantages of the various embodiments disclosed herein will be better understood with respect to the following description and drawings, in which like numbers refer to like parts throughout, and in which.

Embodiments of the invention will now be described by way of example, with reference to the drawings in which.

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
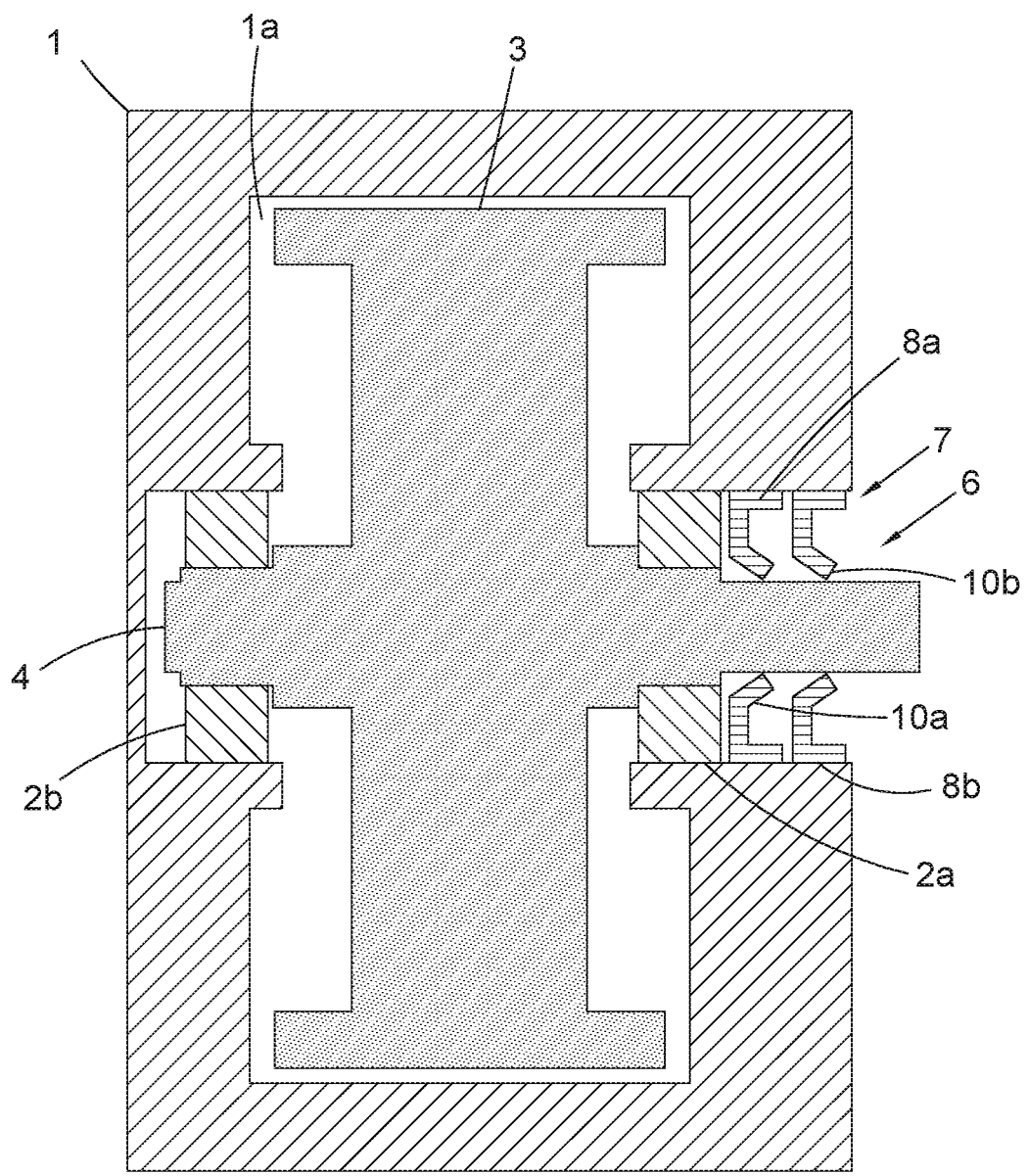
FIG. 1 illustrates a schematic cross section of a flywheel apparatus according to an embodiment of the invention.

With reference to FIG. 1, a flywheel 3 is mounted on a flywheel shaft 4 in an evacuated chamber 1a within a housing 1. The flywheel 3 is mounted on the flywheel shaft 4 such that the flywheel 3 and the flywheel shaft 4 can move (in particular, rotate) substantially together, generally as one mass. The flywheel 3 and the flywheel shaft 4 may, for example, be integrally formed as a single component or may be formed as separate components. The flywheel 3 illustrated by FIG. 1 is of a cross section of a flywheel from a view above the longitudinal axis of the flywheel shaft 4.

The shaft 4 passes through an aperture of the housing (see left and right-hand side of FIG. 1). The shaft 4 is mounted to the housing via bearing arrangements 2a, 2b either side of the flywheel 3.

The bearing arrangements 2a, 2b are mounted on the housing 1 within the chamber 1a and constrained, such that they are substantially fixed in position relative to the housing 1. The bearing arrangements may move axially substantially together with the housing 1. The housing 1 and the bearing arrangements may also or alternatively move radially (i.e. in a direction substantially along a radial line of the shaft 4) substantially together.

The shaft 4 may be linked to a neighbouring drive system (not shown) such as a flywheel drive transmission (that may include a CVT or a Clutched Flywheel Transmission) and permits relative movement of the flywheel 3 and the housing 1 via a drive member (not shown). The neighbouring drive system may itself be operatively coupled to a vehicle prime mover, a final drive or a part of the transmission between the two. Alternatively, it may be another energy source/sink for example, coupled via an electric or hydraulic motor/generator.

The housing 1 comprises an opening 6. The opening provides an interface between the evacuated chamber 1a and outside of the housing 1. The shaft 4 extends from within the housing 1 towards the outside of the housing 1 via the opening 6. The opening 6 has a larger diameter than that of the shaft 4 allowing the shaft 4 to pass through it. The shape of the opening 6 (along a plane substantially parallel to the longitudinal axis of the shaft 4) may substantially correspond to the shape of the shaft 4. Alternatively, the shape of the opening 6 may not correspond to the shape of the shaft 4.

A sealing arrangement 7 is mounted in the opening 6 of the housing 1, i.e. at the interface between the chamber 1a and outside of the housing 1. The opening 6 substantially encircles the sealing arrangement 7, thus the sealing arrangement 7 is contained, axially, within the opening 6. Therefore, a flywheel system is provided whereby the bearing arrangements 2a, 2b are located within the evacuated chamber 1a, and the bearing arrangement 2a is located, or mounted to the shaft 4, axially between the flywheel 3 and the sealing arrangement 7. The benefit of locating the bearing arrangements 2a, 2b within the evacuated chamber 1a with a sealing arrangement 7 at the interface of the chamber 1a will be explained further below.

The sealing arrangement 7 includes a first seal 8a and a second seal 8b which contact or nearly contact the shaft and which are positioned slightly apart from one another along the axis of the shaft 4, so that the two seals 8a, 8b are coaxial and define a cavity between the seals 8a, 8b along the axis of the shaft 4.

In the illustrated examples, the seals 8a, 8b are lip seals, though other types of seals may be used. The seals 8a, 8b substantially contact the shaft 4, so that the seals 8a, 8b seal against the shaft 4. An outer surface of the sealing arrangement 7 is an interference fit with, and forms a seal with, an internal surface or wall of the opening 6 of the housing 1. In some cases, the seals 8a, 8b are not in contact with the shaft 4 and seal against the shaft 4 using a thin layer of film of fluid between the seals 8a, 8b and the shaft 4.

As discussed above, a cavity is defined between the seals 8a, 8b. The seals 8a, 8b define the axial boundaries of the cavity, i.e. the seals 8a, 8b define how far along a line parallel to the axis of the shaft 4 the cavity extends. The shaft 4 defines an inner radial boundary of the cavity, i.e. the shaft 4 demarcates the inner boundary of the cavity in a radial direction of the shaft 4. A circumferential wall (e.g. the wall of the housing which defines the opening 6) defines an outer radial boundary of the cavity, i.e. the circumferential wall demarcates the outer boundary of the cavity in the radial direction of the shaft 4.

The seals 8a, 8b and the cavity extend circumferentially around the shaft 4, so that they encircle the shaft. The seals 8a, 8b and the cavity are positioned and extend in planes roughly orthogonal to the axis of the shaft 4.

The cavity is arranged such that it can be at least partially filled with a sealing fluid. The sealing fluid may be any suitable liquid or gas that prevents fluid(s) from the flywheel system mixing with fluid(s), such as air and/or lubricant, from the neighbouring drive system. In this way, the sealing arrangement 7 can hermetically seal the flywheel system, or housing 1, preventing air and/or lubricants from entering the flywheel system.

In the illustrated example, the cavity is filled with an oil that acts as the sealing fluid. The sealing fluid also serves the purpose of removing heat from the seals, keeping the seals cool. The seals 8a, 8b are arranged such that they retain the sealing fluid within the cavity, or retain as much of the sealing fluid as possible within the cavity. In this case, a thin layer of film forms between the seals 8a, 8b which lubricates, and reduces the wear of, the seals 8a, 8b. In some cases, no thin layer of film is formed between the seals 8a, 8b.

Depending on the geometry of the wall that demarcates the outer radial boundary of the cavity, the cavity may be annular in cross section, with a circular outer radial boundary. In the illustrated example, the cavity is concentric with the shaft 4. However, in other examples, the cavity and the shaft 4 may be eccentric.

Each of the seals 8a, 8b has a corresponding lip portion 10a, 10b. The seals 8a, 8b are orientated such that lip portions 10a, 10b face outwardly, with respect to the bearing arrangement 2a, and extend towards to the outside of the housing 1. In particular, the lip portion 10a of the first seal 8a extends axially towards the second seal 8b, and the lip portion 10b of the second seal 8b extends axially towards the outside of the housing 1. The seals 8a, 8b, in combination with the sealing fluid, are arranged to prevent ingress of fluids (e.g. air, lubricant) and other matter into the chamber 1a within the housing 1.

A vacuum pump (not shown) is arranged to maintain a low pressure Pc within the chamber 1a of the housing 1. Preferably, the low pressure Pc is close to vacuum pressure. The seals 8a, 8b and sealing fluid help in maintaining the low pressure Pc on the bearing arrangement side of the sealing arrangement 7, within the chamber 1a. Evacuating the chamber 1a lowers the pressure within the chamber 1a, preferably to approximately a vacuum level, meaning that the flywheel 3 experiences less air resistance as it rotates in the chamber.

However, in some cases, the pressure Pc may be higher than vacuum pressure, but still low enough to substantially reduce the air resistance experienced by the flywheel as it rotates in the chamber. For example, the pressure Pc may be less than 200 mbar, less than 50 mbar, or less than 10 mbar.

The sealing arrangement 7 is arranged to maintain a pressure difference between its two sides, i.e. between the vacuum side of the sealing arrangement 7, within the chamber 1a, and the atmosphere side of the sealing arrangement 7, outside of the chamber 1a. For example, if the pressure Pc is approximately 50 mbar, the pressure difference between the vacuum side of the sealing arrangement 7 and the atmosphere side of the sealing arrangement 7 would be approximately 950 mbar. The sealing arrangement 7 may form a hermetic seal against the shaft 4. Thus, the sealing arrangement 7 helps to ensure the chamber 1 within the housing is substantially hermetically sealed.

Therefore, the bearing arrangements 2a, 2b are located within the hermetically sealed environment, i.e. within the chamber 1a that is sealed by sealing arrangement 7. As pointed to earlier, a flywheel system arranged in this way is advantageous when compared to a conventional flywheel system with bearing arrangements located outside of the hermetically sealed environment. This is because, in an arrangement as per the present invention, a single sealing arrangement is sufficient to hermetically seal the chamber 1a, allowing both the bearing arrangements 2a, 2b and the flywheel 3 to operate in a low (close to vacuum) pressure. In conventional arrangements, at least two sealing arrangements are required (i.e. a sealing arrangement either side of the flywheel) to hermetically seal the evacuated operational environment of the flywheel 3.

The greater the number of sealing arrangements that are required to hermetically seal an operational environment of the flywheel 3, the more the frictional losses of the flywheel will increase due to increased contact between seals and the shaft, as well as sealing fluid which may leak out of the sealing arrangements and into the operational environment. Therefore, a flywheel system arranged as per the present invention (i.e. with bearing arrangement 2a, 2b located within the evacuated chamber 1a) results is less frictional losses of the flywheel relative to a conventional flywheel arrangement (i.e. with bearing arrangements located outside an evacuated chamber). In other words, locating the bearing arrangements 2a, 2b, within the chamber 1a removes the requirement for a second sealing arrangement, resulting in a more kinetically efficient flywheel system. This also reduces the overall cost and complexity of the system, as fewer sealing arrangements are required.

In the case where the seals 8a, 8b do not contact the shaft 4, the thin layer or film of fluid is between the lip portions 10a, 10b of the seals 8a, 8b and the shaft 4, and may ensure that the hermetic seal is formed.

Having the lip portions 10a, 10b of the seals 8a, 8b configured in the above described way allows the pressure of the sealing fluid within the cavity of the seals 8a, 8b to be maintained at an intermediate pressure Ps, between the pressure Pc within the chamber 1 and the ambient atmospheric pressure, i.e. the pressure outside of the chamber 1. Preferably, the intermediate pressure Ps is approximately halfway between the pressure Pc and the pressure outside of the chamber 1. For example, if the pressure Pc is approximately 50 mbar, the intermediate pressure Ps, of the sealing fluid, is maintained at approximately 525 mbar. In this way, a relatively low pressure delta is maintained across each of the seals 8a, 8b, for example when compared to the pressure delta across the seals of a sealing arrangement that is maintained at a pressure above atmospheric pressure. Maintaining a relatively low pressure delta across the seals 8a, 8b helps to increase the life of the seals, when compared with the life of seals having a higher pressure delta being maintained across them.

The seals 8a, 8b may be polymeric seals such as polyimide seals or rubber seals, some examples of the types of rubber being Nitrile Rubber (NBR), Hydrogenated Nitrile (HNBR), and Fluoroelastomer (FKM). The seals 8a, 8b may include polytetrafluoroethylene (PTFE), graphite, molybdenum disulphide and/or other materials. In some examples, the seals 8a, 8b may be magnetic liquid rotary seals or mechanical face or shaft seals.

Figure 2:
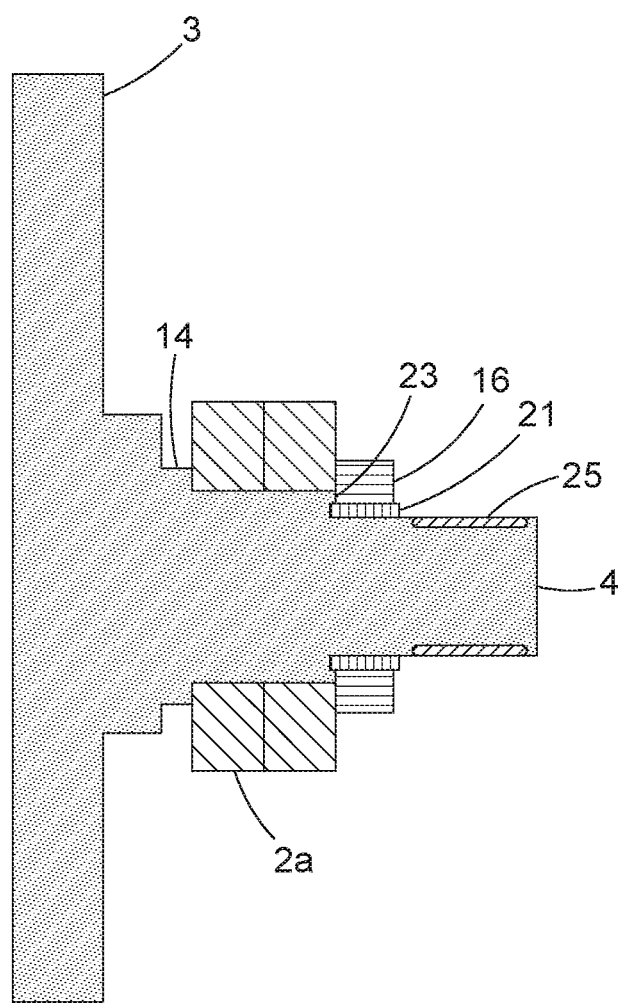
FIG. 2 illustrates an embodiment of the invention whereby the sealing arrangement is mounted to the housing via the seal carrier.

As illustrated in FIG. 2, the bearing arrangement 2a is mounted on the shaft 4 such that it abuts an inner shoulder 14 on the shaft 4 that is proximate to the flywheel 3. A nut 16 is mounted on the shaft 4 via threading 21 such that the nut 16 abuts the bearing arrangement 2a on the shaft. In this way, the nut 16 clamps the bearing arrangement 2a against the inner shoulder 14 such that an inner race of the bearing arrangement 2a locates with the shaft 4. The inner shoulder 14 is located between the flywheel 3 and the outer shoulder 23, and the outer shoulder 23 is located between the sealing arrangement 7 (not shown in FIG. 2) and the bearing arrangement 2a.

In some embodiments, another suitable means for clamping the bearing arrangement against the inner shoulder may be used, other than a threaded nut. In this case, there is no threading 21 on the shaft 4.

The inner and outer shoulders 14, 23 are provided on the shaft 4 via steps in the shaft 4. A diameter of the shaft 4 therefore decreases towards the distal end of the shaft 4 following each step in the shaft 4. As a result, a diameter of the shaft between the flywheel 3 and the inner shoulder 14 is greater than a diameter of the shaft 4 between the inner shoulder 14 and the outer shoulder 23. Similarly, a diameter of the shaft 4 between the inner shoulder 14 and the outer shoulder 23 is greater than a diameter of the shaft 4 that extends beyond the outer shoulder 23, i.e. towards the distal end of the shaft 4 from the flywheel 3. In this way, the inner shoulder 14 is provided on the shaft 4 for the bearing arrangement 2a to abut against. The outer shoulder 23 may be formed on the shaft 4 as a result of the threading 21 being formed on the shaft 4 for the nut 16 to engage with.

As discussed above, the shaft 4 defines an inner radial boundary of the cavity of the sealing arrangement 7. At this inner radial boundary, i.e. between the shaft 4 and the cavity, the sealing arrangement 7 provides a radial sealing contact surface 25 on the shaft 4. Due to the stepped arrangement of the shaft 4, a diameter of the sealing contact surface 25 (along a radial line of the shaft) is less than a diameter of an inner race of the bearing arrangement. This is because the diameter of the shaft 4 at the sealing arrangement 7 is less than the diameter of the shaft at the bearing arrangement 2a.

In this document, a diameter of the inner race of the bearing arrangement means a diameter of an inner radial face of the inner race which contacts the shaft 4.

The skilled person will understand that a bearing arrangement for a rotating shaft typically comprises an inner race and an outer race, whereby the inner race contacts the shaft 4.

In some embodiments, there may be no outer shoulder 23. In this case, the inner race of the bearing arrangement 2a is fixed to the shaft 4 such that the diameter of the sealing contact surface 25 is equal to the diameter of the inner race of the bearing arrangement 2a (i.e. the diameter of the shaft 4 at the bearing arrangement is the same as the diameter of the shaft at the sealing arrangement).

Providing a sealing contact surface 25 with a diameter that is less than or equal to the diameter of the inner race allows the sealing arrangement 7 to effectively seal the flywheel 3 and bearing arrangements 2a, 2b, within the evacuated chamber 1a by preventing fluids from entering or exiting the chamber 1a.

A smaller sealing contact surface diameter is advantageous because it reduces the frictional sliding losses of the seal, as both the contact length and sliding speed of the seals are reduced. In addition, the reduction in frictional losses of the seals enable the bearing arrangements 2a, 2b to be mounted closer to the centre of the flywheel 3, reducing the length of the shaft 4 required which increases the stiffness of the flywheel system. In this way, the vibrational response of the flywheel to gyroscopic forces, for example if the flywheel is mounted on a vehicle and the vehicle yaws due to navigating a corner, is improved.

In other flywheel systems, bearing arrangements may be mounted to the shaft outside of the evacuated chamber (i.e. the sealing arrangements are between the bearings and the flywheel). In this configuration, a sealing arrangement has a sealing contact surface with a diameter that is greater than the diameter of the inner race of the bearing. This is because a shoulder must be provided on the shaft for the bearing to abut against, meaning the diameter of the shaft at the sealing arrangement will be greater than the diameter of the shaft at the bearing arrangement.

Mounting the bearing arrangements 2a, 2b of the flywheel system within the evacuated chamber 1a, as in the present invention, allows the sealing arrangement 7 to be mounted on the shaft 4 after the bearing arrangement 2a, which allows a smaller diameter of the sealing contact surface 25 of the sealing arrangement 7 to be achieved.

Figure 3:
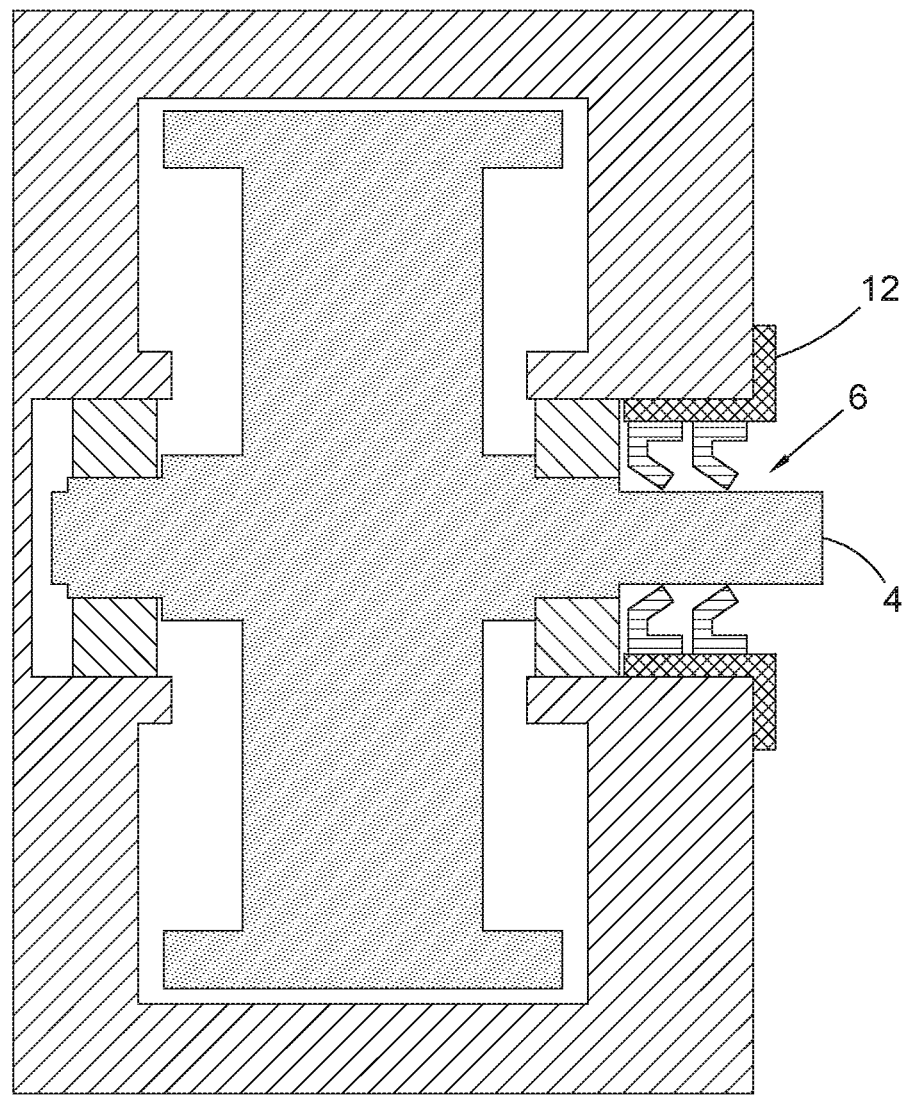
FIG. 3 illustrates a magnified view of the bearing arrangement without showing the seal carrier.

In some embodiments, as illustrated by FIG. 3, the sealing arrangement 7 is mounted to the housing via a seal carrier 12. In this case, an inner circumferential wall of the seal carrier 16 defines the outer radial boundary of the cavity. The seal carrier 12 is mounted to the housing 1 at the opening 6, and is substantially encircled by the opening 6. In this embodiment, the sealing arrangement 7 is substantially coaxial with the seal carrier 12.

The seal carrier 12 is substantially annular in shape such that it substantially surrounds and contains, axially, the sealing arrangement 7. The seal carrier 12 allows the sealing arrangement 7, or more specifically the seals 8a, 8b, to be more easily mounted onto the shaft 4 after the shaft 4 has been mounted to the flywheel 3 within the housing 1. This is because the seals 8a, 8b are pre-mounted as a pair to the seal carrier 12 before the carrier 12 is mounted the housing 1, which is done in a single operation. The seals 8a, 8b are mounted to the seal carrier 12 from each of its sides (i.e. seal 8a from one side of the carrier 12 and seal 8b from the other side of the carrier 12), which allows seals of substantially the same diameter to be more readily installed into the seal carrier 12, and thus onto the shaft 4.

In this embodiment, the seal carrier 12 is a separate member. In this case, the seal carrier 12 is sealed against the opening 6 of the housing 1 via an annular seal (not shown), such as an O ring, which encircles and mounts the seal carrier 12 to opening 6. Mounting the seal carrier 12 to the opening 6 in this way, i.e. via the annular seal, also rotationally constrains the seal carrier 12 such that the sealing arrangement 7 rotates relative to the seal carrier 12, along with the shaft 4 and the flywheel 3.

In other embodiments, the seal carrier 12 may be integral with the housing. In this document, the term 'integral' means formed together from the same material.

Figure 4:
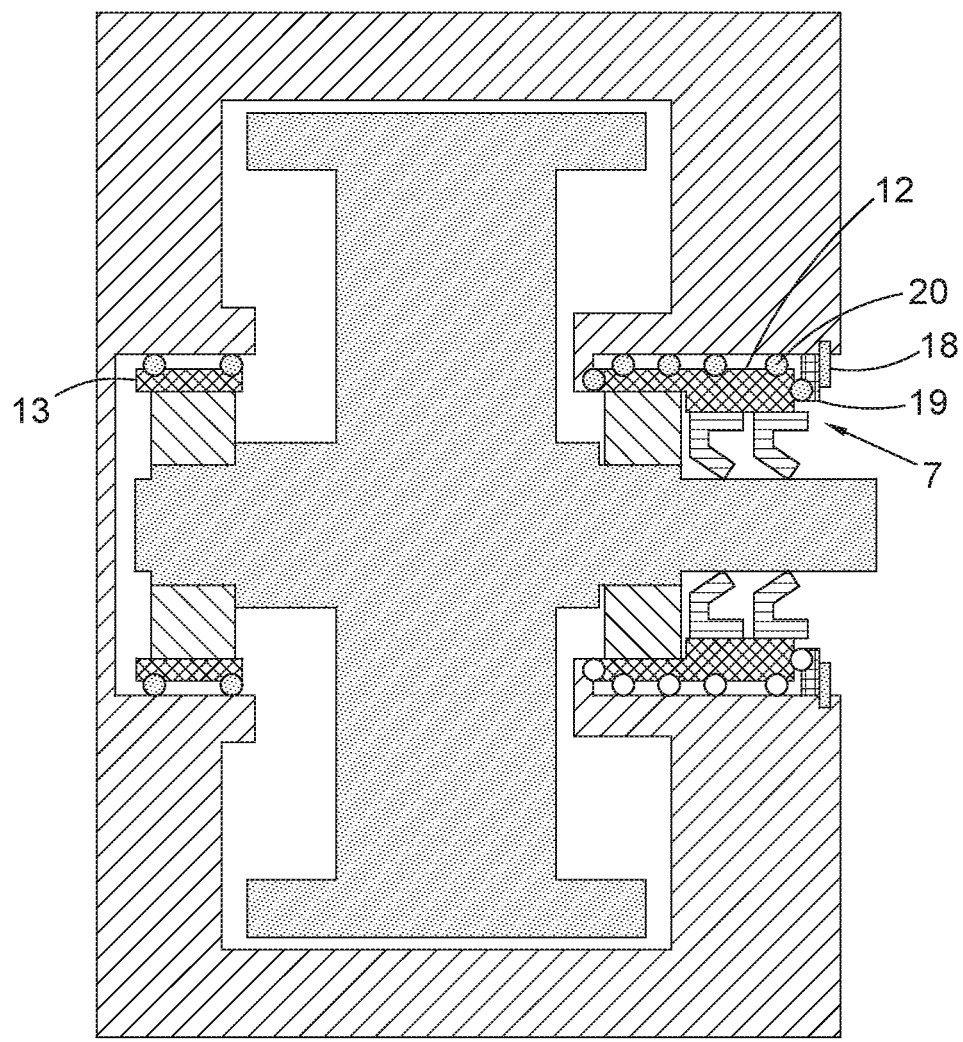
FIG. 4 illustrates an embodiment of the invention whereby the bearing arrangement is mounted to the housing via the seal carrier, which is modified to receive the bearing arrangement.

In some embodiments, as illustrated by FIG. 4, the bearing arrangement 2a, is mounted to the housing 1 via the seal carrier 12. In this case, the seal carrier 12 is structurally modified, for example extended axially towards the flywheel 3, to receive the bearing arrangement 2a such that the bearing arrangement 2a is mounted to the housing 1 via the seal carrier 12. In other words, in this embodiment, the seal carrier 12 serves as a bearing arrangement and seal carrier. The bearing arrangement 2b is mounted to the housing via a bearing carrier 13.

The seal carrier 12 and bearing carrier 13 are mounted to the housing 1 via elastomeric rings 20. The elastomeric rings 20 are arranged to reduce multi-body resonance that occurs as a result of the interaction between the housing 1 and flywheel 3. This ensures that the natural modes of the flywheel do not interfere with the natural modes of the housing and vice versa, thereby allowing full speed operation of the flywheel without producing damaging resonance. The elastomeric rings 20 also serve to seal the seal carrier 12 against the housing 1. In some embodiments, less preferentially, the seal carrier 12 and/or bearing carrier 13 may be mounted to the housing 1 directly, without elastomeric rings.

The seal carrier 12 is configured to axially constrain the flywheel 3. For example, this may be achieved via a retaining ring 18 that is mounted to the housing 1, and to the seal carrier 12 via a spacer 19. In some embodiments, the seal carrier 12 may not axially constrain the flywheel 3.

Figure 5:
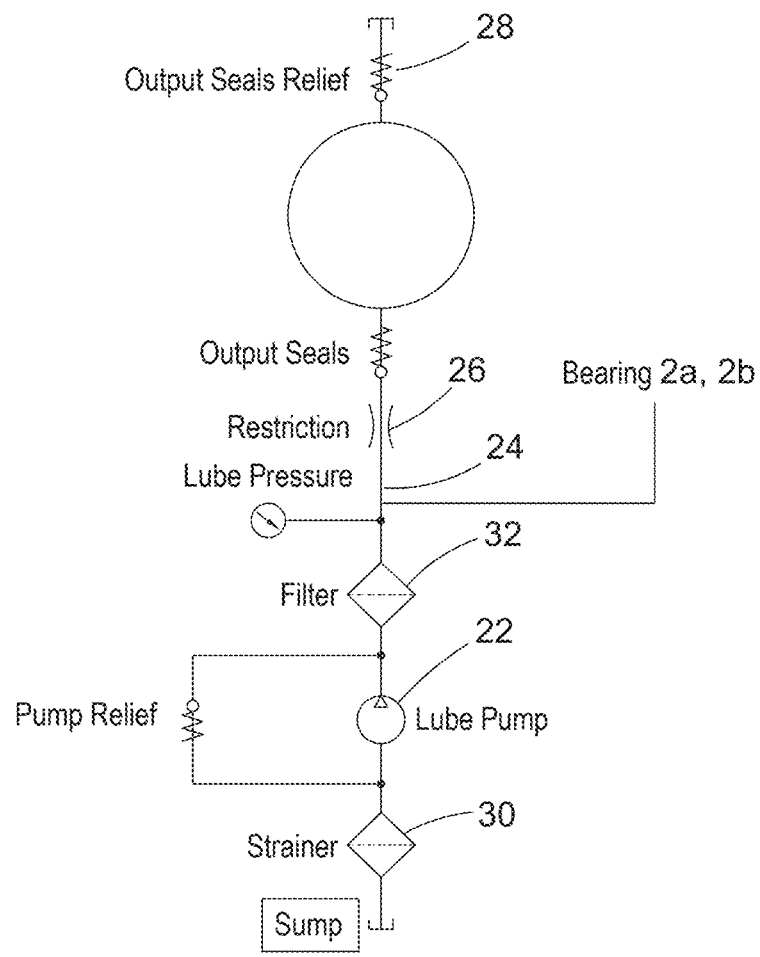
FIG. 5 illustrates a schematic of the lubricant flow control system.

As illustrated by FIG. 5, a lubricant system is arranged to deliver lubricant from a lubricant reservoir (not shown) to the sealing arrangement 7 using a pump 22. Although not shown by FIG. 5, the pump 22 is also arranged to deliver lubricant to the bearing arrangements 2a, 2b.

Figure 6:
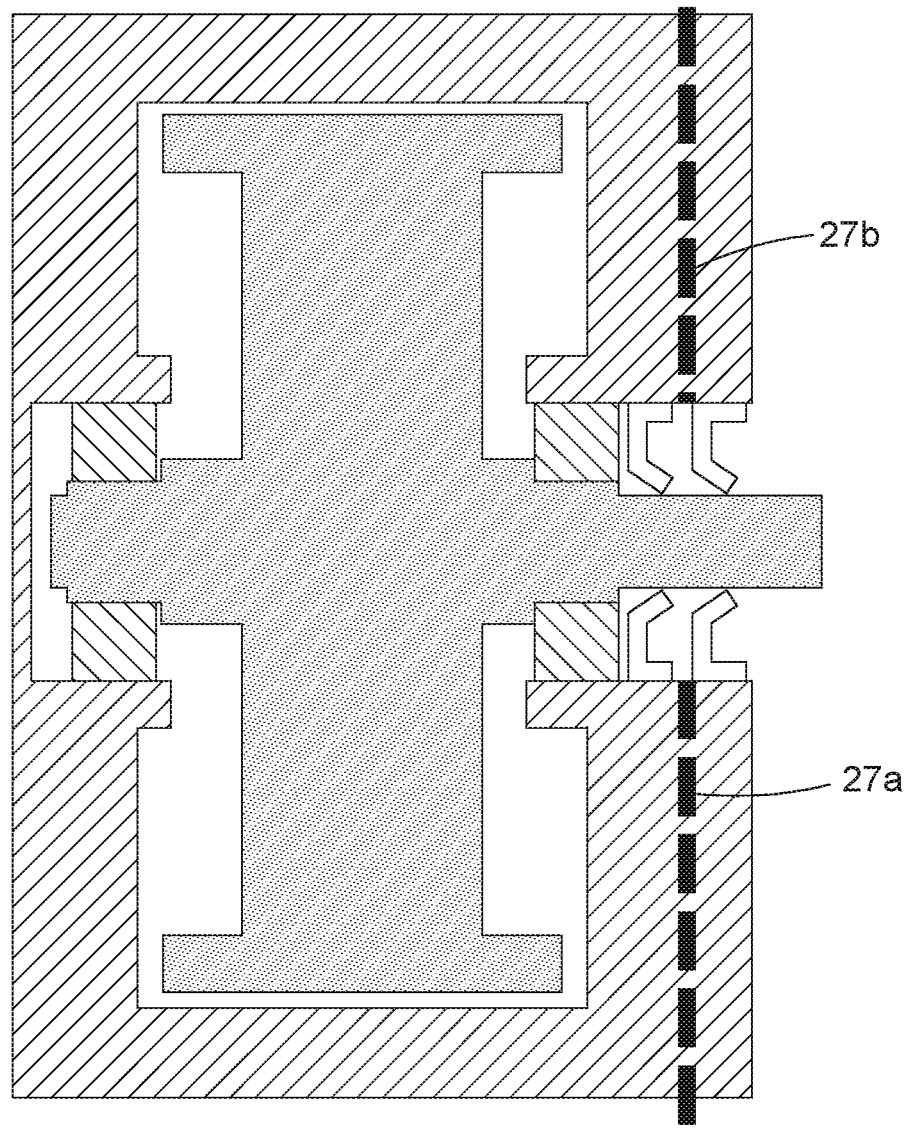
FIG. 6 illustrates oil flow paths to the sealing arrangement.

As illustrated in FIG. 6, lubricant is delivered to and from the cavity of the sealing arrangement 7 via flowpaths 27a, 27b. From example, lubricant may be delivered to the sealing arrangement 7 via flowpath 27a and returned to the lubricant reservoir (not shown) via flowpath 27b. The flowpaths 27a, 27b may be provided in the housing during manufacture, such as by drilling holes in the housing In some embodiments, the seal carrier 12 is configured to allow lubricant to be delivered to and from the sealing arrangement 7. In this case, flowpaths for the lubricant connect between the sealing arrangement 7 and the lubricant reservoir through the seal carrier 12.

Having both the bearing arrangements 2a, 2b and the flywheel 3 operate within the evacuated chamber 1a allows the pump 22 to be driven directly by the flywheel 3 by rotatably coupling the pump 22 to the flywheel 3. This is beneficial, as it allows the lubricant system to be integrated within the chamber 1a, resulting in a more compact and relatively less complex system design relative to a conventional system having to integrate lubrication apparatus that is outside of the evacuated chamber.

Further, having the lubricant system operate in a low pressure environment is advantageous because any lubricant in the evacuated chamber 1a will be at substantially the same pressure at the lubricant reservoir. This mitigates the need for the pump 22 to forcibly remove lubricant from the chamber 1a, and the requirement for a control valve to facilitate the removal of this lubricant.

In some embodiments, the pump 22 is not driven directly by the flywheel 3, and is instead driven by an electric motor. In this case, the electric motor may be directly mounted to a sump of the housing 1.

The lubricant flow delivered to the bearing arrangements 2a, 2b and the sealing arrangement 7 is managed by controlling the pressure Pm of a main lubricant rail 24. The pressure Pm of the main lubricant rail 24 is generally limited by a main oil rail relief valve (not shown) and is maintained within a pre-determined range above the low pressure Pc created within the chamber 1a. The pressure Ps of lubricant delivered to cavity of the seals 8a, 8b is maintained at a pressure lower than the main lubricant rail pressure Pm and above the low pressure Pc within the chamber 1a such that:

$$Pm > Ps > Pc$$

Maintaining the pressure Pm within a pre-determined range above the low pressure Pc created within the chamber 1a ensures a consistent flow of lubricant is delivered to the bearing arrangements over a wide range of operating speeds of the flywheel 3. Maintaining the pressure Ps of lubricant delivered to the seals 8a, 8b below Pm ensures good reliability of the sealing ability of the sealing arrangement 7 despite drops in pressure on the main lubricant rail 24.

In particular, the flow of lubricant delivered to the cavity of the seals 8a, 8b is controlled, for example using a restrictor 26, such that the lubricant flowrate is maintained in a controlled range at normal operating speeds of the flywheel 3. Further, the pressure difference between Pc and Ps is maintained at approximately a fixed value, for example using a check valve 28 or pressure relief valve, at normal operating speeds of the flywheel. Preferably, the fluid removed from the seals via the check valve 28 is returned to the lubricant reservoir for subsequent use. 'Normal' operating speeds of the flywheel 3 are speeds above 10% of the flywheel 3 charge, which is approximately 30% of the maximum speed of the flywheel.

The maximum pressure of the pre-determined pressure range for Pm is controlled such that if the pressure exceeds the maximum pressure, lubricant is permitted to flow away from the main lubricant rail 24 until the pressure returns to below the maximum pressure of the pre-determined range. The skilled person will understand that a check valve may be used to achieve this. This 'excess flow' of lubricant can optionally be directed towards the lubricant reservoir or returned to the inlet of the pump 22.

At the inlet of the pump 22, a strainer 30 prevents ingress of debris into the pump 22, and at the outlet of the pump 22, a filter 32 prevents ingress of relatively smaller debris, not captured by the strainer 30, from being delivered to the bearing arrangements 2a, 2b and the sealing arrangement 7. Optionally, a heat exchanger (not shown) may help regulate the temperature of the lubricant being delivered.

A direct pathway between the lubricant reservoir and the inlet of the pump 22 mitigates any potential pressure drop that might occur to the inlet of the pump 22, due to a partial vacuum and/or partial blockage at the inlet, decreasing the likelihood of cavitation of the pump 22—the direct pathway maximises the lubricant pressure at the inlet of the pump 22. The strainer 30 described above is mounted on this direct pathway. Although the low pressure Pc is close to vacuum pressure, the pressure Pc is high enough such that cavitation of the pump 22 is mitigated.

The vacuum pump is coupled to the chamber 1a via a vacuum port (not shown). The vacuum port is proximal to the flywheel 3, as no lubricant is directly exhausted onto the flywheel 3. Thus, any lubricant inadvertently entering the vacuum pump, for example by splashing of the lubricant, is mitigated.

In some embodiments, a labyrinth arrangement (not shown) is mounted at the inlet of the vacuum port, i.e. a passage of the vacuum port coupled to the chamber 1a, and captures any lubricant that has managed to reach the vacuum port, for example droplets of splashed, and redirects the captured lubricant to the lubricant reservoir. In some embodiments, the labyrinth arrangement is arranged to seal the chamber 1a when the vacuum pump in not in operation, for example using a check valve between the labyrinth arrangement and the vacuum port—in some cases, the vacuum pump may provide this functionality.

In the illustrated example, lubricant is used as the sealing fluid. The lubricant might for instance be a gear oil, an automatic transmission fluid, or a continuously variable transmission fluid such as a traction fluid which may be used in the case of a traction drive.

In some examples, the lubricant may be a low-viscosity oil. The oil may for example have a kinematic viscosity of between approximately 5 mm$^2$ s$^{-1}$ and 15 mm$^2$ s$^{-1}$ at a working temperature of the flywheel apparatus. Low-viscosity oil may advantageously reduce drag in the sealing arrangements.

Any sealing fluid which leaks past sealing arrangement 7, closest to the bearing arrangement 2a, out of the cavity and into the chamber 1a is directed towards and gathered at the lubricant reservoir before being returned directly to the pump 22.

In summary, mounting the bearing arrangements within the evacuated chamber allows the chamber to be sealed using only one sealing arrangement, reducing frictional losses of the flywheel due to contact between the seals and the shaft. Further, this configuration allows the diameter of the sealing contact surface of the sealing arrangement to be less than a diameter of an inner race of the bearing arrangement, further reducing frictional losses of the flywheel caused by sliding of the seals, as both the contact length and the sliding speed of the seals are reduced.

The invention claimed is:

1. An apparatus comprising:
   a flywheel;
   a shaft;
   a bearing arrangement for supporting the shaft;
   a sealing arrangement; and
   a housing for housing the flywheel, the shaft, the bearing arrangement and the sealing arrangement, wherein the flywheel is mounted on the shaft, the sealing arrangement is mounted between the shaft and the housing, and the bearing arrangement is mounted both to the shaft, between the flywheel and the sealing arrangement, and to the housing; and
   wherein the sealing arrangement comprises a pair of seals that are configured to extend circumferentially around the shaft, the seals being arranged to form a hermetic seal against the shaft to hermetically seal the housing, wherein a cavity is defined between the seals, the cavity also extending circumferentially around the shaft; and
   wherein, in use, the sealing arrangement is arranged to maintain a first pressure within the housing that is lower than a second pressure outside of the housing, the seals and pressure control circuit being arranged to retain a sealing fluid within the cavity, and to maintain the fluid at an intermediate pressure between the first and the second pressure.

2. The apparatus according to claim 1, wherein the bearing arrangement has an inner face that contacts the shaft, and the sealing arrangement seals against the shaft via a sealing contact surface; and
   wherein a diameter of the seal contact surface is less than or equal to a diameter of the inner face.

3. The apparatus according to claim 1, wherein the shaft comprises a first shoulder, between the flywheel and the bearing arrangement, against which the bearing arrangement abuts, and a second shoulder, between the bearing arrangement and the sealing arrangement.

4. The apparatus according to claim 1, further comprising a seal carrier that substantially encircles the sealing arrangement and is configured to mount the seals to the housing.

5. The apparatus according to claim 4, wherein the bearing arrangement is mounted to the housing via the seal carrier.

6. The apparatus according to claim 5, wherein the seal carrier comprises an elastomeric component that is arranged to mount the seal carrier to the housing.

7. The apparatus according to claim 5, wherein the seal carrier is arranged to axially constrain the flywheel.

8. The apparatus according to claim 4, wherein the seal carrier is arranged to allow fluid to be delivered to and from the sealing arrangement.

9. The apparatus according to claim 1, further comprising a lubricant pump that is driven directly by the flywheel and arranged to circulate lubricant from a lubricant supply to the bearing arrangement.

10. The apparatus according to claim 1, further comprising a lubricant pump that is driven by an electric motor and arranged to circulate lubricant from a lubricant supply to the bearing arrangement.

11. The apparatus according to claim 10, wherein the housing further comprises a sump, and the lubricant pump is mounted to the sump.

12. The apparatus according to claim 9, wherein the lubricant pressure at an outlet of the lubricant pump is maintained within a pre-determined range above the first pressure.

13. The apparatus according to claim 12, wherein an excess flow of lubricant is arranged to be released to ensure the maximum pressure of the pre-determined range is not exceeded.

14. The apparatus according to claim 13, wherein the released excess flow of lubricant is supplied to the lubricant supply.

15. The apparatus according to claim 9, wherein the lubricant pressure at an inlet of the lubricant pump is maximised using a direct path from the lubricant supply to the inlet of the lubricant pump.

16. The apparatus according to claim 1, wherein the intermediate pressure is approximately halfway between the first and second pressure.

17. The apparatus according to claim 1, wherein the first pressure is approximately less than 200 mbar.

18. The apparatus according to claim 1, wherein the seals are lip seals, and the lip of each seal extend away from the bearing arrangement.

19. The apparatus according to claim 1, wherein the flywheel is configured to rotate at speeds of 10,000 rpm or higher.

* * * * *